July 17, 1962 L. P. GAJDA ET AL 3,044,599
FEEDING MECHANISM
Filed Aug. 17, 1959 2 Sheets-Sheet 1

INVENTORS
LEO P. GAJDA &
WALTER S. KAZMIERCZAK
BY
Barnes, Kisselle, Raisch & Choate
ATTORNEYS July 17, 1962  L. P. GAJDA ET AL  3,044,599
FEEDING MECHANISM
Filed Aug. 17, 1959  2 Sheets-Sheet 2
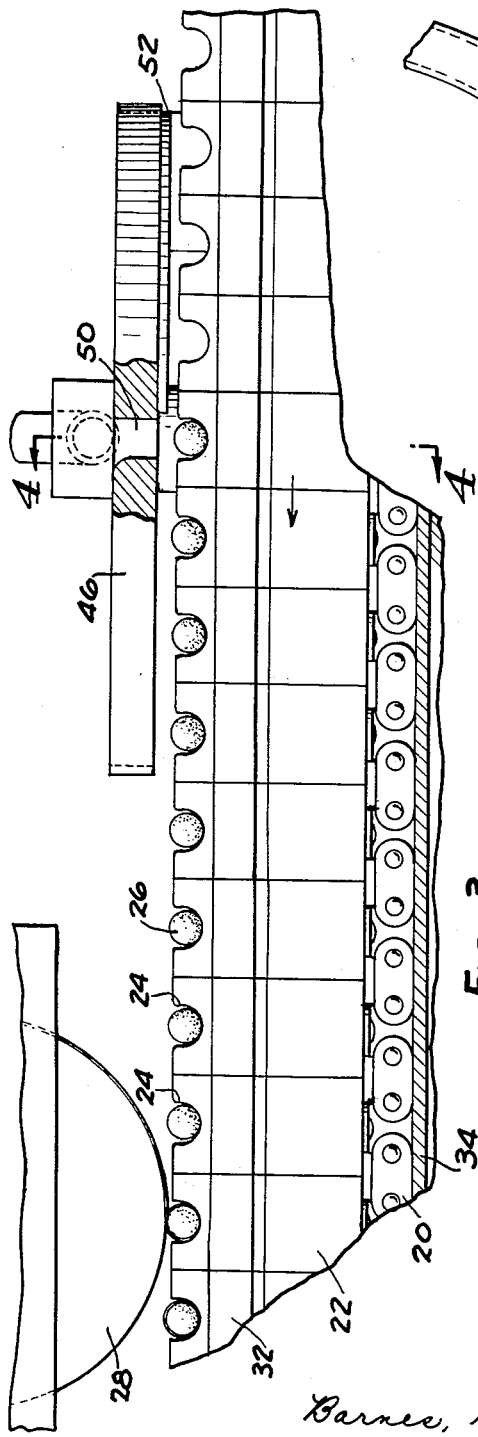
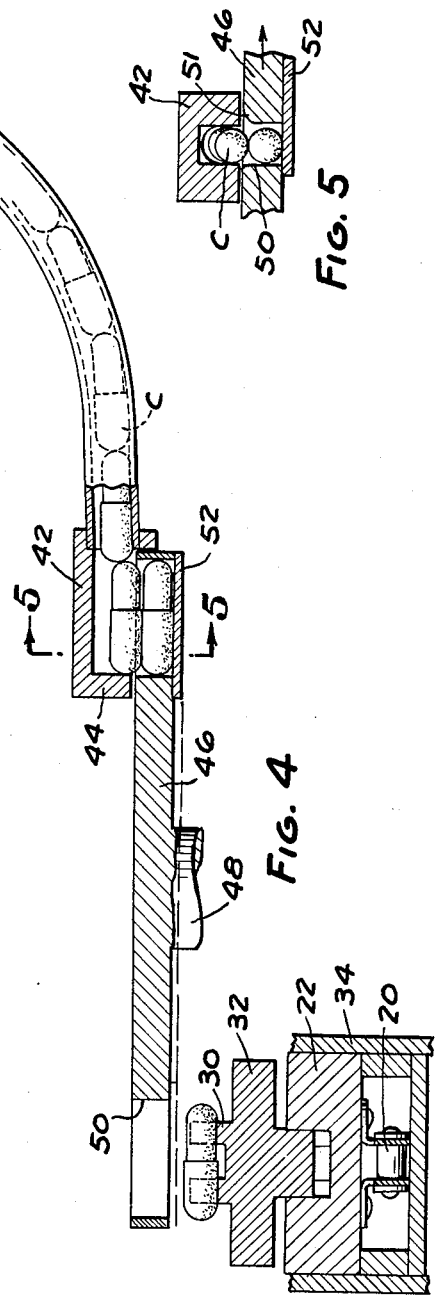
INVENTORS
LEO P. GAJDA &
WALTER S. KAZMIERCZAK
BY
Barnes, Kisselle, Raisch & Choate
ATTORNEYS

United States Patent Office 3,044,599
Patented July 17, 1962

3,044,599
FEEDING MECHANISM
Leo P. Gajda and Walter S. Kazmierczak, Detroit, Mich., assignors to Arthur Colton Company, Detroit, Mich., a corporation of Michigan
Filed Aug. 17, 1959, Ser. No. 834,020
1 Claim. (Cl. 198—25)

This invention relates to a feeding device for capsules. Frequently, pharmaceutical capsules are banded primarily for the purpose of sealing the capsules and sometimes for the purpose of identifying the capsules. A reference is made to Colton Patent No. 1,861,047, describing this banding operation and to a co-pending application of Victor C. Hall, Serial No. 689,858, filed October 14, 1957, now Patent No. 2,962,851, describing a banding machine.

In the process of banding, it is necessary that capsules be fed from a supply into a continuous conveyor which permits each capsule to be handled individually.

The present invention relates to a selector and feeding mechanism which permits this distribution of capsules into a continuous conveyor after end-to-end orientation in a feed tube.

A problem in the feeding of these capsules is to avoid mechanical damage to the rather fragile casings and to avoid any handling which will cause or permit the telescoped capsule ends to open up in a rapidly operating machine.

According to the present invention, the capsules are delivered to a pocketed turn-table and confined longitudinally while moving over a release plate which drops the capsule into a travelling pocket of a continuous conveyor.

Other objects and features relating to details of construction and operation will be apparent in the following description and claim.

Figure 1:
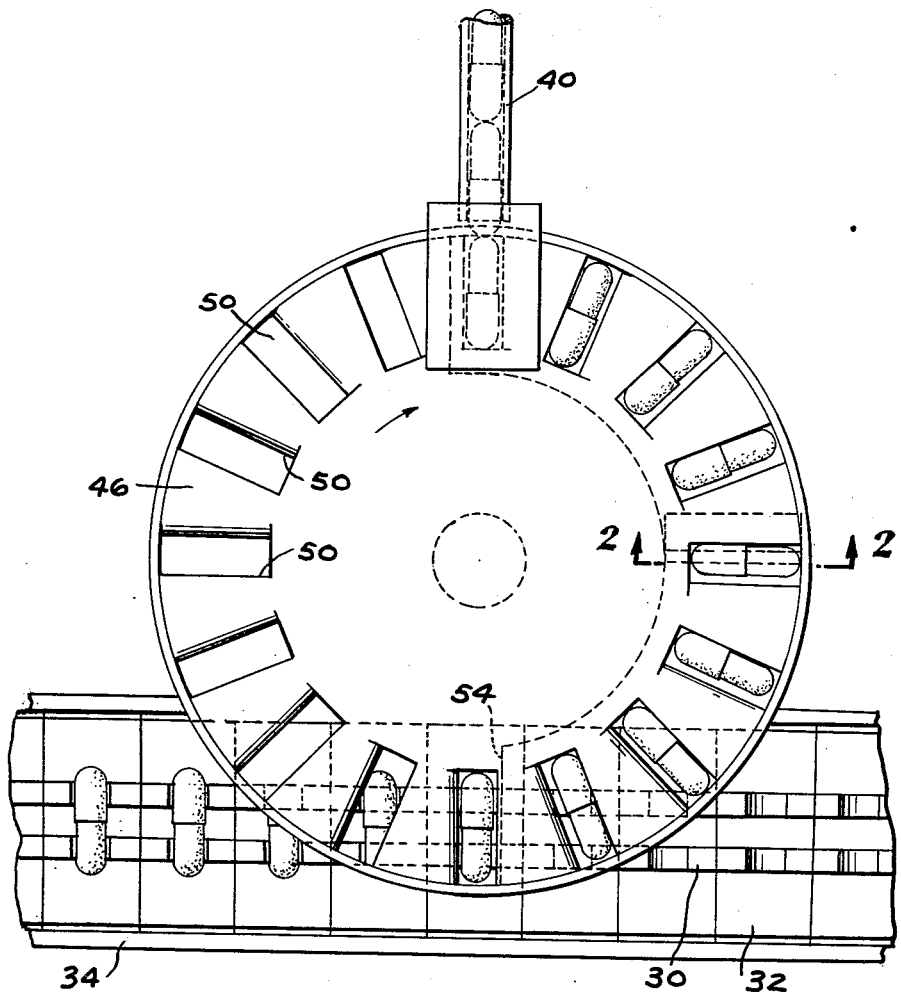

Drawings accompany the disclosure, and the various views thereof may be briefly described as:

FIGURE 1, a plan view of a feeding mechanism showing the relationship to a capsule conveyor.

Figure 2:
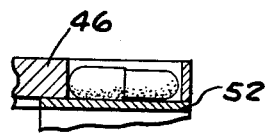

FIGURE 2, a sectional view on line 2—2 of FIGURE 1.

FIGURE 3, a side elevation of the feeding mechanism.

FIGURE 4, a sectional view on line 4—4 of FIGURE 3.

FIGURE 5, a sectional view on line 5—5 of FIGURE 4.

Referring to the drawings, a capsule conveyor is shown having a chain drive 20 with individual blocks 22, each having at the top a cross passage 24 for receiving elongate, telescoping capsules 26. A capsule bander wheel 28 of the type described in the above Hall application is suitably mounted adjacent the blocks 22. The capsules are actually supported as shown in FIGURE 4 in upstanding lugs 30 provided with the recess 24, these lugs being formed on the top of a block 32 riding on the blocks 22 driven by the chain 20. A suitable guide track 34 is provided for the continuous conveyor.

Referring to FIGURES 1 and 4, a feed chute 40 receives a continuous supply of capsules from a suitable orienting and feeding mechanism such as a vibratory hopper. These capsules "C" feed down to within the confines of a small rectangular housing 42 having an end wall 44, this housing overlying a turn table disc 46 rotatably mounted on a shaft 48. The disc 46 is provided with a plurality of radial recesses 50 about the size of a capsule and dimensioned to receive and circumferentially confine the capsules as shown in FIGURE 4. The radial edges of the recesses 50 are curved and the leading radial edge 51 is curved in a relatively wide radius to lead the capsule into the recess from the chamber in housing 42.

Underlying the rim of the disc 46 is a semi-circular delivering plate in the form of a segmental ring 52. This ring extends a little less than half way around the disc 46 terminating at an edge 54, FIGURE 1, which is parallel with the trailing edge of the recess 50 as the disc 46 moves in a clockwise direction.

The feeding assembly is so positioned relative to the conveying train for the capsules that the opening which parallels the terminal edge 54 overlies exactly the capsule recess in the blocks 32 as they pass tangentially underneath the disc 46 as it rotates. The rotation of the disc 46 is synchronized with the motion of the conveyor; and it will be seen that the capsules will feed from the housing 42 into radial recesses 50 and ride around the semi-circular ring 54 to the discharge point overlying the horizontal conveyor. Thus, a continuous supply of capsules can be furnished to the conveyor leading to the coating wheel 28, regardless of the speed of operation. Centrifugal action in the disc 46 will tend to close the capsules in high speed operation.

We claim:

A device for transferring fragile elongate telescoping capsules from a storage container to a rapid-operating, horizontal conveyor leading to a banding station which comprises a vertical feed chute for receiving a continuous supply of capsules in end-to-end relation to be fed by gravity to the lower outlet end of the tube which is curved to a horizontal outlet, a transfer mechanism to carry capsules from said horizontal outlet to said rapidly moving continuous conveyor comprising a horizontal rotating disc having a plurality of elongate annularly-disposed, radial recesses adjacent but terminating inside the periphery thereof in a vertical wall, said recesses extending axially through said disc, the apertured annular portion of said disc passing under the horizontal outlet of said chute and overlying said conveyor in tangential relation thereto each of said radial recesses having a curved edge along the top radial leading side to blend with the curve of said telescoped capsules, said outlet being positioned relative to said recesses wherein a capsule in said recess will serve as a roller bearing for a capsule in said tube moving radially inward over the recessed portion of said disc, and a segmental confining plate underlying said disc from a position below said horizontal outlet to a radial terminating edge at said conveyor, the terminating edge being parallel with receiving recesses in said conveyor wherein capsules leaving said outlet of said chute and rolling into recesses of said disc will be carried over said plate in rolling relation thereto and dropped into the passing recesses of said conveyor.

References Cited in the file of this patent

UNITED STATES PATENTS

| | | |
|---|---|---|
| 1,077,335 | Dusha et al. | Nov. 4, 1913 |
| 2,553,095 | Jones | May 15, 1951 |
| 2,572,164 | Lehman | Oct. 23, 1951 |
| 2,737,833 | Plagemann | Mar. 13, 1956 |
| 2,949,998 | Whitecar | Aug. 23, 1960 |

FOREIGN PATENTS

| | | |
|---|---|---|
| 1,172,678 | France | Oct. 20, 1958 |